(12) United States Patent
Yamamoto

(10) Patent No.: US 9,519,275 B2
(45) Date of Patent: Dec. 13, 2016

(54) ACTUATOR CONTROL METHOD AND ACTUATOR CONTROL DEVICE

(75) Inventor: Yasushi Yamamoto, Chigasaki (JP)

(73) Assignee: ISUZU MOTORS LIMITED, Tokyo (JP)

( * ) Notice: Subject to any disclaimer, the term of this patent is extended or adjusted under 35 U.S.C. 154(b) by 413 days.

(21) Appl. No.: 14/345,167

(22) PCT Filed: Aug. 10, 2012

(86) PCT No.: PCT/JP2012/070480
§ 371 (c)(1),
(2), (4) Date: Mar. 14, 2014

(87) PCT Pub. No.: WO2013/038856
PCT Pub. Date: Mar. 21, 2013

(65) Prior Publication Data
US 2014/0350730 A1    Nov. 27, 2014

(30) Foreign Application Priority Data
Sep. 16, 2011 (JP) ................. 2011-202769

(51) Int. Cl.
*G05B 11/01* (2006.01)
*G05B 13/02* (2006.01)
(Continued)

(52) U.S. Cl.
CPC ............. *G05B 13/02* (2013.01); *G05B 11/16* (2013.01); *G05B 11/36* (2013.01); *G05B 13/021* (2013.01);
(Continued)

(58) Field of Classification Search
CPC .... B60W 10/18; B60W 30/18127; B60L 7/18; B60L 7/10; G05B 13/02; G05B 19/23; G05B 19/29; G05B 2219/43064; G05B 2219/43045
See application file for complete search history.

(56) References Cited

U.S. PATENT DOCUMENTS 3,835,360 A * 9/1974 Kiwiet ................. G05B 19/253
                                                     318/561
4,200,827 A * 4/1980 Oswald ................ G05B 19/232
                                                     318/561
(Continued)

FOREIGN PATENT DOCUMENTS

EP    0 103 493 A1    3/1984
EP    0 461 915 A2   12/1991
(Continued)

OTHER PUBLICATIONS

Patent Abstracts of Japan, Publication No. 5-224702, Published Sep. 3, 1993.
(Continued)

*Primary Examiner* — Darrin Dunn
(74) *Attorney, Agent, or Firm* — Staas & Halsey LLP

(57) ABSTRACT

In an actuator control method and an actuator control device, time optimal control is used, and a switching time at which an acceleration output is switched to a deceleration output, and an end time of the deceleration output are calculated using a maximum acceleration and a maximum deceleration at the time of a maximum output of a control force. A control force of an actuator is set as a maximum acceleration output from a calculation time to the switching time, the control force of the actuator is set as a maximum deceleration output from the switching time to the end time, output of the control force is ended at the end time, and the switching time and the end time are repeatedly calculated, and updated for each preset time. The control output is reduced along with decrease of residual energy, which is a sum of remaining work and kinetic energy of a control system. From this, an element of feedback control is incorporated in the time optimal control, and the control output is converged after the end of the control.

16 Claims, 15 Drawing Sheets

(51) Int. Cl.
*G05B 19/416* (2006.01)
*G05B 11/16* (2006.01)
*G05B 11/36* (2006.01)
*G05B 19/23* (2006.01)
*G05B 19/29* (2006.01)
*G05B 19/35* (2006.01)

(52) U.S. Cl.
CPC .............. *G05B 19/23* (2013.01); *G05B 19/29* (2013.01); *G05B 19/35* (2013.01); *G05B 19/416* (2013.01); *G05B 2219/41086* (2013.01); *G05B 2219/41087* (2013.01); *G05B 2219/41414* (2013.01); *G05B 2219/43034* (2013.01); *G05B 2219/43062* (2013.01)

(56) References Cited

U.S. PATENT DOCUMENTS

| | | | | |
|---|---|---|---|---|
| 4,488,242 A * | 12/1984 | Tabata | ............... | G05B 19/39 318/561 |
| 5,004,968 A * | 4/1991 | Mizuno | ............... | G05B 19/416 318/571 |
| 5,119,250 A * | 6/1992 | Green | ............... | G11B 21/083 318/561 |
| 5,331,264 A * | 7/1994 | Cheng | ............... | G05B 19/416 318/560 |
| 5,508,596 A * | 4/1996 | Olsen | ............... | G05B 19/237 318/569 |
| 5,602,689 A | 2/1997 | Kadlec et al. | | |
| 5,677,609 A | 10/1997 | Khan et al. | | |
| 5,811,952 A * | 9/1998 | Kato | ............... | G05B 19/416 318/561 |
| 5,953,493 A * | 9/1999 | Sano | ............... | B25J 9/1664 700/245 |
| 6,002,184 A | 12/1999 | Delson et al. | | |
| 6,166,504 A * | 12/2000 | Iida | ............... | B25J 9/1674 318/560 |
| 6,686,716 B1 | 2/2004 | Predina et al. | | |
| 8,024,052 B1 | 9/2011 | Hakala | | |
| 8,082,062 B2 * | 12/2011 | Dariush | ............... | B25J 9/0006 700/245 |
| 8,185,243 B2 * | 5/2012 | Okazaki | ............... | B25J 9/1075 700/254 |
| 8,209,100 B2 * | 6/2012 | Sin | ............... | B60T 7/042 303/155 |
| 8,335,600 B2 * | 12/2012 | Breit | ............... | B64C 13/50 244/99.2 |
| 2005/0189895 A1* | 9/2005 | Muroi | ............... | B41J 19/202 318/376 |
| 2005/0209535 A1* | 9/2005 | Dariush | ............... | A61B 5/4528 600/595 |
| 2006/0190136 A1* | 8/2006 | Boyer | ............... | B25J 9/1664 700/245 |
| 2006/0282022 A1* | 12/2006 | Dariush | ............... | A61B 5/4528 600/595 |
| 2006/0293791 A1* | 12/2006 | Dariush | ............... | B25J 9/0006 700/245 |
| 2007/0208488 A1* | 9/2007 | Seethaler | ............... | F01L 1/04 701/101 |
| 2008/0082203 A1* | 4/2008 | Watanabe | ............... | G05B 19/40937 700/187 |
| 2009/0105877 A1* | 4/2009 | Hellstrom | ............... | B25J 19/0004 700/245 |
| 2010/0234974 A1* | 9/2010 | Bosga | ............... | B30B 15/148 700/100 |
| 2014/0121837 A1* | 5/2014 | Hashiguchi | ............... | B25J 9/0087 700/261 |
| 2014/0200787 A1* | 7/2014 | Takahashi | ............... | B60T 8/1755 701/83 |
| 2014/0363150 A1* | 12/2014 | Griffin | ............... | F16H 21/18 396/454 |
| 2015/0134224 A1* | 5/2015 | Vaughan | ............... | B60W 30/143 701/93 |

FOREIGN PATENT DOCUMENTS

| | | |
|---|---|---|
| JP | 58-119004 | 7/1983 |
| JP | 61-77905 | 4/1986 |
| JP | 62-120515 | 6/1987 |
| JP | 5-224702 | 9/1993 |
| JP | 7-302121 | 11/1995 |
| JP | 11-296234 | 10/1999 |
| JP | 2000-94371 | 4/2000 |
| JP | 2011-85984 | 4/2011 |
| WO | 2013/0086002 | 1/2013 |

OTHER PUBLICATIONS

Patent Abstracts of Japan, Publication No. 11-296234, Published Oct. 29, 1999.
Patent Abstracts of Japan, Publication No. 61-77905, Published Apr. 21, 1986.
Patent Abstracts of Japan, Publication No. 58-119004, Published Jul. 15, 1983.
Patent Abstracts of Japan, Publication No. 62-120515, Published Jun. 1, 1987.
Patent Abstracts of Japan, Publication No. 2000-94371, Published Apr. 4, 2000.
International Search Report mailed Sep. 4, 2012, in corresponding International Application No. PCT/JP2012/070480.
International Search Report mailed Jul. 17, 2012 in corresponding International Application No. PCT/JP2012/065886, 2 pages.
Annex to the European Search Report on European Patent Application No. EP 12 81 1162 dated Nov. 10, 2015, 1 page.
Office Action dated Aug. 26, 2016 in related U.S. Appl. No. 14/232,167.
U.S. Appl. No. 14/232,167, filed Jan. 10, 2014, Yasushi Yamamoto, Isuzu Motors Limited.

\* cited by examiner

Time

ACTUATOR CONTROL METHOD AND ACTUATOR CONTROL DEVICE

CROSS REFERENCE TO RELATED APPLICATIONS

This application is a U.S. national stage application of PCT/JP2012/070480 filed Aug. 10, 2012, and claims foreign priority benefit of Japanese Application No. 2011-202769 filed Sep. 16, 2011, in the Japanese Intellectual Property Office, the entire disclosure of which are incorporated herein by reference.

TECHNICAL FIELD

The present invention relates to an actuator control method and an actuator control device and, in more detail, to an actuator control method and an actuator control device that can incorporate a feedback element by using a control law to modify an output pattern for each preset time in time optimal control, and can converge a control output after the end of the control.

BACKGROUND ART

In conventional control, feedback control of PID control has been generally used. In the PID control, a control output is always determined with a delay from a phenomenon, and thus, when each control gain of PID is increased in an attempt to increase a control speed, the control no longer catches up with a phenomenon, and thus, the control becomes unstable. Particularly, when a mechanical damping force of a controlled object remarkably reduces, the control easily becomes unstable, and the control may diverge in some cases. As a method for determining each control gain of the PID control in order to avoid the instability of the control, a control theory, such as an H∞, which can ensure the stability of control is applied. However, under a restriction of the PID control, overshoot and control delay occur due to load fluctuation.

Also in the PID control, when sliding mode control is used, influence of load fluctuation can be theoretically eliminated by switching control gains according to a control state. However, when a control period is lengthened, the control keeps oscillating and no longer converges. Therefore, in order to completely eliminate the influence of the load fluctuation, control gains need to be switched at an infinitely high speed, and high-speed control is needed to an extent that can be said to be infinitely fast with respect to a phenomenon. Furthermore, since adjustment of each control gain, such as PID, is needed, and quality of adjustment of the control gain determines quality of control, the adjustment of the control gain becomes a very important factor.

In addition, these control theories are the theories to make up for faults of the PID control, and are not techniques constructed for a purpose of control to "stop a controlled object at a target position in a shortest time". Therefore, for this simple purpose, it can be said that time optimal control is a control method more suitable for the purpose rather than the PID control.

Simplest time optimal control is the control to stop a controlled object at a target position by accelerating the controlled object by means of a maximum thrust force up to a halfway point to the target position, and by decelerating it at a maximum deceleration in the rest of the way. Since this output pattern is determined before the start of the control, the time optimal control can be said to be feedforward control.

In other words, the time optimal control is a control method for moving a controlled object by a maximum driving force of an actuator and stopping by a maximum braking force, and is the control that can stop the controlled object at a target in the shortest time in theory. That is, the time optimal control is the control method that perfectly meets a purpose of control to "stop the controlled object at the target position in the shortest time".

For example, as described in Japanese patent application Kokai publication No. 2000-94371, as a control device using the time optimal control, a time optimal control device of a robot is proposed, which includes: a control unit configured to control a servomotor; a correspondence relation storage unit configured to store a relation between a controlled variable on the basis of a value at the time of no load and a load weight; a load estimation calculation unit; an acceleration/deceleration constant determination unit configured to determine an acceleration/deceleration constant based on workpiece information calculated by the load estimation calculation unit; and a command creation unit configured to create a command to be delivered to the servo control unit using the determined acceleration/deceleration constant, and which lengthens an acceleration time when grasping a workpiece and shortens the acceleration time when not grasping the workpiece.

However, while the time optimal control is the ideal control that can control with the shortest time in theory, it is an open control in which an output pattern is determined by taking into consideration an initial velocity, a maximum acceleration, and a maximum deceleration, and since there is no feedback element, there is such a problem that no modification method can be used when the target and the controlled variable do not agree, and that it is difficult to make the target and the controlled variable accurately agree with each other, and thus the time optimal control is rarely employed in actual control.

PRIOR ART DOCUMENT

Patent Document 1: Japanese patent application Kokai publication No. 2000-94371

SUMMARY OF THE INVENTION

In contrast with this, the present inventors have thought out an actuator control method and an actuator control device that use time optimal control, and also calculates a switching time t1 at which an acceleration output is switched to a deceleration output and an end time t2 of the deceleration output expressed by an elapsed time from a calculation time t0 at which calculation for control is performed using a maximum acceleration up and a maximum deceleration am, which are previously measured, at the time of a maximum output of a control force of an actuator, sets the control force of the actuator as a maximum acceleration output from the calculation time t0 to the switching time t1, sets the control force of the actuator as a maximum deceleration output from the switching time t1 to the end time t2, ends the output of the control force at the end time t2, and also repeats the calculation step for each preset time, and calculates and updates the switching time t1 and the end time t2.

Since these control method and control device have incorporated the feedback element that updates the switching time and the end time for each preset time by inputting a deviation of the target variable and the controlled variable at each time of control, an effect to be able to always obtain a stable control result can be exerted even though an external force changes or without shortening a time interval of the control.

However, in these control method and control device, a problem occurs that a pulsed control output remains to be generated even though a controlled variable agrees with a control target.

The present invention has been made in view of the above-described circumstances, and an object thereof is to provide an actuator control method and an actuator control device that incorporates an element of feedback control in time optimal control, and that can converge a control output after the end of the control.

An actuator control method of the present invention for achieving the object as describe above is the method characterized by using time optimal control, and also including: a calculation step of calculating a switching time (t1) at which an acceleration output is switched to a deceleration output, and an end time (t2) of the deceleration output expressed by an elapsed time from a calculation time (t0) at which calculation for control is performed using a maximum acceleration ($\alpha p$) and a maximum deceleration ($\alpha m$) at the time of a maximum output of a control force of an actuator, which are previously measured; a control output step of setting the control force of the actuator as a maximum acceleration output from the calculation time (t0) to the switching time (t1), setting the control force of the actuator as a maximum deceleration output from the switching time (t1) to the end time (t2), and ending the output of the control force at the end time (t2); an update step of repeating the calculation step for each preset time, and calculating and updating the switching time (t1) and the end time (t2); and a control output reduction step of reducing the control output along with decrease of residual energy, which is a sum of remaining work and kinetic energy of a control system.

That is, a target trajectory of the control from a position of a controlled object at the calculation time t0 to a target position is recalculated in consideration of a deviation and speed for each constant period or for each irregular period, which is for each preset time, and the switching time t1 and the end time t2 are updated. These switching time t1 and end time t2 serve as elapsed times from a recalculated calculation time t0.

It is to be noted that the maximum acceleration $\alpha p$ or the maximum deceleration $\alpha m$ is a second-order time derivative value of a control value, or a second-order difference value of the control value, and that even a control value, such as a temperature without motion, can be applied.

According to this method, because of the time optimal control, a control speed is high, the maximum acceleration $\alpha p$ and the maximum deceleration $\alpha m$ can be set by measurement, and there is no adjustment term other than these, so that the control gain need not be adjusted. In addition, since the control serves as ON/OFF control, an intermediate output need not be generated, and a controller and a driver can be simplified.

In addition, since incorporated is the feedback element that updates the switching time t1 and the end time t2 for each preset time by inputting a deviation X of the target variable and the controlled variable at each time of the control, stable control results can be always obtained even though an external force changes or without shortening a time interval of the control. As a result of it, a "control speed" and "stability", which have been competing large problems in a conventional control law, can be balanced.

Moreover, a control output can be converged to be zero after the end of the control by reducing the control output along with decrease of the residual energy, which is the sum of the remaining work and the kinetic energy of the control system.

In addition, in the above-described actuator control method, when in the control output reduction step, values are set as outputs of the control force, the values being obtained by multiplying each of the maximum acceleration output and the maximum deceleration output by the residual energy, and further multiplying the multiplied values by an energy gain, which is a coefficient for determining a size of the control output with respect to the residual energy, the control output can be easily converged to be zero after the end of the control.

In addition, in the above-described actuator control method, when in the update step, values obtained by multiplying the maximum acceleration and the maximum deceleration by a control output limit value are recalculated as a new maximum acceleration and maximum deceleration, the control output can be easily converged to be zero after the end of the control.

In addition, in the above-described actuator control method, given that in the calculation step, a trajectory from a position at the calculation time t0 to a target position at the end time t2 is represented by a combination of adjacent two quadratic curves, an initial velocity is set as V0, and that deviation of the target position and a controlled variable is set as X, when the switching time t1 and the end time t2 are calculated by Expressions (1) and (2),

[Formula 1]

$$t1 = \frac{-2(\alpha 1 - \alpha 2)V0 \pm \sqrt{4(\alpha 1 - \alpha 2)^2 V0^2 - 4(\alpha 1 - \alpha 2)(V0^2 - 21X\alpha 2)\alpha 1}}{2\alpha 1(\alpha 1 - \alpha 2)} \quad \text{Expression (1)}$$

[Formula 2]

$$t2 = \frac{-(\alpha 1 - \alpha 2)t1 - V0}{\alpha 2} \quad \text{Expression (2)}$$

the switching time t1 and the end time t2 can be easily calculated. It is to be noted that $\alpha 1$ is the maximum acceleration $\alpha p$ or the maximum deceleration $\alpha m$ from the calculation time t0 to the switching time t1, and that $\alpha 2$ is the maximum deceleration $\alpha m$ or the maximum acceleration $\alpha p$ from the switching time t1 to the end time t2.

Additionally, an actuator control device of the present invention for achieving the object as describe above uses the time optimal control, and is configured to include: a calculation unit configured to calculate the switching time t1 at which the acceleration output is switched to the deceleration output, and the end time t2 of the deceleration output expressed by the elapsed time from the calculation time t0 at which calculation for control is performed using the maximum acceleration $\alpha p$ and the maximum deceleration $\alpha m$ at the time of the maximum output of the control force of the actuator, which are previously measured; a control output unit configured to set the control force of the actuator as the maximum acceleration output from the calculation time t0 to the switching time t1, set the control force of the actuator as the maximum deceleration output from the switching time t1 to the end time t2, and to end the output of the control force at the end time t2; and also an update unit configured to repeatedly calculate, and update the switching time t1 and the end time t2 by the calculation unit for each preset time; and further a control output reduction unit configured to reduce the control output along with decrease of the residual energy, which is the sum of the remaining work and the kinetic energy of the control system.

In addition, in the above-described actuator control device, the control output reduction unit is configured to set values as outputs of the control force, the values being obtained by multiplying each of the maximum acceleration output and the maximum deceleration output by the residual energy, and further multiplying the multiplied values by an energy gain, which is a coefficient for determining a size of the control output with respect to the residual energy.

In addition, in the above-described actuator control device, the update unit is configured to recalculate values obtained by multiplying the maximum acceleration and the maximum deceleration by a control output limit value as a new maximum acceleration and maximum deceleration.

In addition, in the above-described actuator control device, given that a trajectory from a position at the calculation time t0 to a target position at the end time t2 is represented by a combination of adjacent two quadratic curves, an initial velocity is set as V0, and that a deviation of the target position and a controlled variable is set as X, the calculation unit is configured to calculate the switching time t1 and the end time t2 by Expressions (1) and (2).

[Formula 1]

$$t1 = \frac{-2(\alpha 1 - \alpha 2)V0 \pm \sqrt{4(\alpha 1 - \alpha 2)^2 V0^2 - 4(\alpha 1 - \alpha 2)(V0^2 - 2 1 X \alpha 2)\alpha 1}}{2\alpha 1(\alpha 1 - \alpha 2)} \quad \text{Expression (1)}$$

[Formula 2]

$$t2 = \frac{-(\alpha 1 - \alpha 2)t1 - V0}{\alpha 2} \quad \text{Expression (2)}$$

It is to be noted that $\alpha 1$ is the maximum acceleration $\alpha p$ or the maximum deceleration $\alpha m$ from the calculation time t0 to the switching time t1, and that $\alpha 2$ is the maximum deceleration $\alpha m$ or the maximum acceleration $\alpha p$ from the switching time t1 to the end time t2.

In addition, in the above-described actuator control device, by Table 1, determined are the acceleration $\alpha 1$ from the calculation time t0 to the switching time t1, and the acceleration $\alpha 2$ from the switching time t1 to the end time t2.

TABLE 1

| | | | | |
|---|---|---|---|---|
| A1 | X > 0 | $V_0$ > 0 | $V0^2/2\alpha m$ > X | $\alpha 1 = \alpha m, \alpha 2 = \alpha p$ |
| A2 | | | $V0^2/2\alpha m$ < X | $\alpha 1 = \alpha p, \alpha 2 = \alpha m$ |
| A3 | | $V_0$ < 0 | | $\alpha 1 = \alpha p, \alpha 2 = \alpha m$ |
| A4 | X < 0 | $V_0$ > 0 | | $\alpha 1 = \alpha m, \alpha 2 = \alpha p$ |
| A5 | | $V_0$ < 0 | $V0^2/2\alpha p$ > X | $\alpha 1 = \alpha m, \alpha 2 = \alpha p$ |
| A6 | | | $V0^2/2\alpha p$ < X | $\alpha 1 = \alpha p, \alpha 2 = \alpha m$ |

According to the actuator control device configured as described above, the above-described actuator control method can be carried out, and a similar effect can be exerted.

According to the actuator control method and the actuator control device pertaining to the present invention, because of the time optimal control, the control speed is high, the maximum acceleration and the maximum deceleration can be set by measurement, and there is no adjustment term other than these, so that the control gain need not be adjusted. In addition, since the control serves as the ON/OFF control, the intermediate output need not be generated, and the controller and the driver can be simplified.

In addition, since incorporated is the feedback element that updates the switching time and the end time for each preset time by inputting the deviation of the target variable and the controlled variable at each time of the control, stable control results can be always obtained even though the external force changes or without shortening the time interval of the control. As a result of it, the "control speed" and the "stability", which have been competing large problems in the conventional control law, can be balanced.

Moreover, the control output can be converged after the end of the control by reducing the control output along with decrease of the residual energy, which is the sum of the remaining work and the kinetic energy of the control system.

DESCRIPTION OF THE EMBODIMENTS

Hereinafter, with reference to drawings, will be explained an actuator control method and an actuator control device of an embodiment pertaining to the present invention. It is to be noted that the actuator control method and the actuator control device will be explained here comparing with PID control in order to clarify time optimal control of the present invention.

The actuator control device of the embodiment pertaining to the present invention uses the time optimal control, and is configured to include: a calculation unit; a control force output unit; an update unit; and a control output reduction unit.

This calculation unit calculates a switching time t1 at which an acceleration output is switched to a deceleration output, and an end time t2 of the deceleration output expressed by an elapsed time from a calculation time t0 at which calculation for control is performed using a maximum acceleration αp and a maximum deceleration αm at the time of a maximum output of a control force of an actuator, which are previously measured.

In addition, the control output unit sets the control force of the actuator as a maximum acceleration output from the calculation time t0 to the switching time t1, sets the control force of the actuator as a maximum deceleration output from the switching time t1 to the end time t2, and ends the output of the control force at the end time t2.

Furthermore, the update unit is configured to update the switching time t1 and the end time t2 repeatedly calculated by the calculation unit for each preset time of a constant period or an irregular period. In addition, the control output reduction unit reduces a control output along with decrease of residual energy, which is a sum of remaining work and kinetic energy of the control system.

Given that a trajectory from a position at the calculation time t0 to be recalculated to a target position is represented by a combination of two adjacent quadratic curves, an initial velocity is set as V0, and that a deviation of a target variable and a controlled variable is set as X, the calculation unit calculates the switching time t1 and the end time t2 by the following two Expressions (1) and (2).

[Formula 1]
$$t1 = \frac{-2(\alpha 1 - \alpha 2)V0 \pm \sqrt{4(\alpha 1 - \alpha 2)^2 V0^2 - 4(\alpha 1 - \alpha 2)(V0^2 - 2 1 X \alpha 2)\alpha 1}}{2\alpha 1(\alpha 1 - \alpha 2)} \quad \text{Expression (1)}$$

[Formula 2]
$$t2 = \frac{-(\alpha 1 - \alpha 2)t1 - V0}{\alpha 2} \quad \text{Expression (2)}$$

Here, α1 is the maximum acceleration αp or the maximum deceleration αm from the calculation time t0 to the switching time t1, and α2 is the maximum deceleration αm or the maximum acceleration αp from the switching time t1 to the end time t2.

Figure 1:
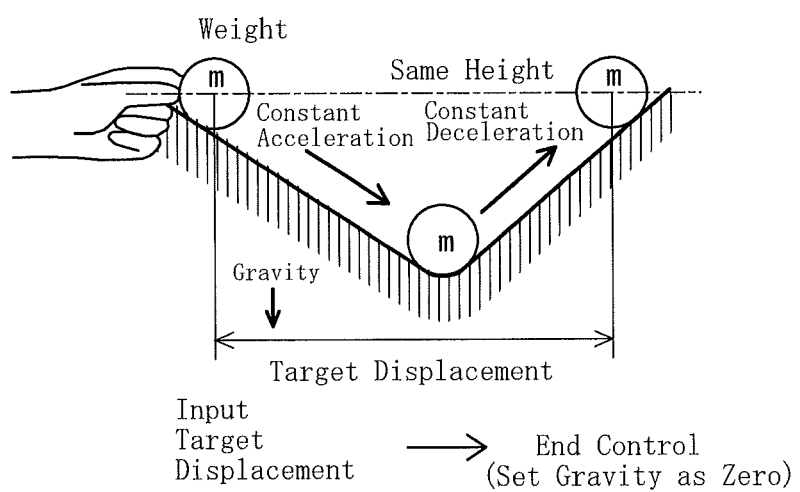
FIG. 1 is a diagram showing a time optimal control model for explaining time optimal control used for an actuator control method of an embodiment of the present invention.

In addition, the time optimal control used for the actuator control method of the embodiment of the present invention is equivalent to a machine model in which a weight m shown in FIG. 1 goes down and goes up an inclined surface. As in FIG. 1, when the weight is released to the inclined surface after lifted, the weight goes down the inclined surface at a constant acceleration due to the gravity, and subsequently goes up an inclined surface of an opposite side at a constant deceleration. If there is no energy loss, such as friction, a velocity of the weight m becomes zero when it reaches a position with a same height as a start position, and the weight stops for a moment. If the gravity disappears at this time, the weight m continues to stop at the position.

When this is replaced with a control system that moves a controlled object by the actuator, in a case where the weight is pushed by a maximum thrust force of an actuator, and subsequently pulled back by the maximum thrust force of the actuator, the controlled object stops when an amount of work input when the weight is pushed, and an amount of work input when it is pulled back are balanced with each other. In a manner as described above, if a position where the controlled object stopped is the target position, control is ended.

That is, since in the time optimal control, the controlled object is accelerated and decelerated by the maximum thrust force of the actuator, and is controlled to be the target position, the control can be performed in a shortest time in theory. In addition, since a control output pattern at this time is determined before the start of the control, the time optimal control serves as feedforward control.

Figure 21:
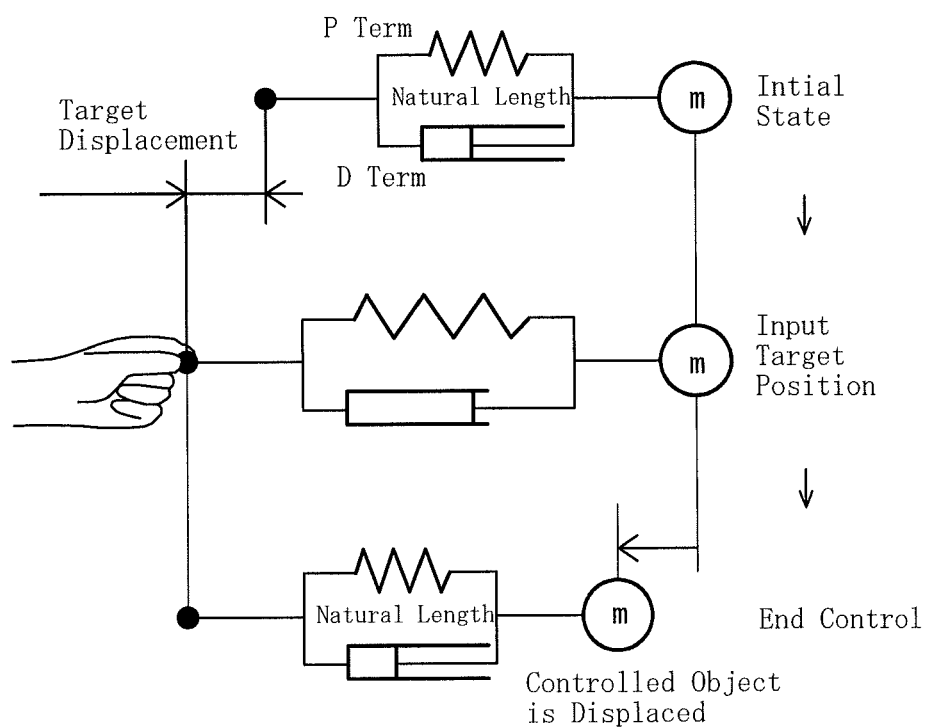
FIG. 21 is a diagram showing a PID control model for explaining PID control.

In contrast with this, the PID control of a conventional technology is the control based on a damped oscillation model of a basic mass m, spring, and damper system as shown in FIG. 21, and the spring fulfills a role of a P term, and a dash pod fulfills a role of a D term. It is to be noted that although a correction term of a zero point serves as an I term, there is little physical meaning in the I term here.

When the control is considered with energy conversion, in a case where as shown in the middle of FIG. 21, the spring is bent as target displacement by inputting a target position, and strain energy of the spring is input to the control system, a weight (mass m) is pulled by a spring force, and starts to move. At this time, conversion into kinetic energy from the strain energy is performed. When the weight m starts motion, kinetic energy is converted into thermal energy by the dash pot, and energy is released to an outside of the system. When all the initially input strain energy of the spring is converted into thermal energy, the weight m, which is the controlled object, stops at the target position as shown in the lower of FIG. 21. It is to be noted that since a control output is determined from a motion state of the controlled object in the PID control, the PID control serves as the feedback control.

As described above, it can be said that the time optimal control and the PID control are fundamentally different control, but meanwhile, when a P gain and a D gain of the PID control are remarkably increased, and an upper limit of an output is cut in a maximum output of the actuator, a control output waveform of the PID control approaches a control output waveform of the time optimal control, and thus it can also be considered that the time optimal control is the control in which the PD gains of the PID control have been increased to a limit. However, in the PID control, when the PD gains are increased too much, the control usually diverges due to delay in calculation and the control. This is because the PID control is the feedback control, a control output is determined always with a delay from a phenomenon, and thus the control diverges when the delay becomes too large.

In contrast with this, since the time optimal control serves as the feedforward control, and a control output in consideration of the start to the stop is determined always prior to a phenomenon, the control is stable, and the control does not diverge even though in the time optimal control, generated is the control output equal to that of the PID control in which the PD gains are increased to the limit.

Figure 19:
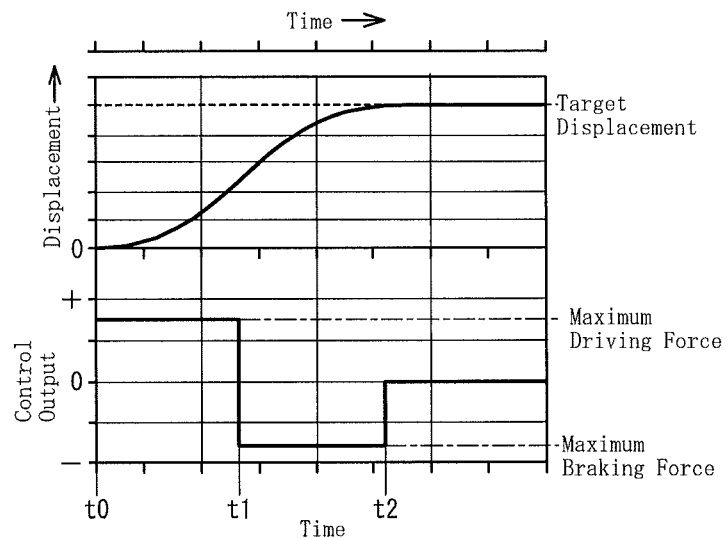
FIG. 19 is a graph showing a control result in a case where there is no damping force of a mechanical system of time optimal control of a conventional technology.
Figure 20:
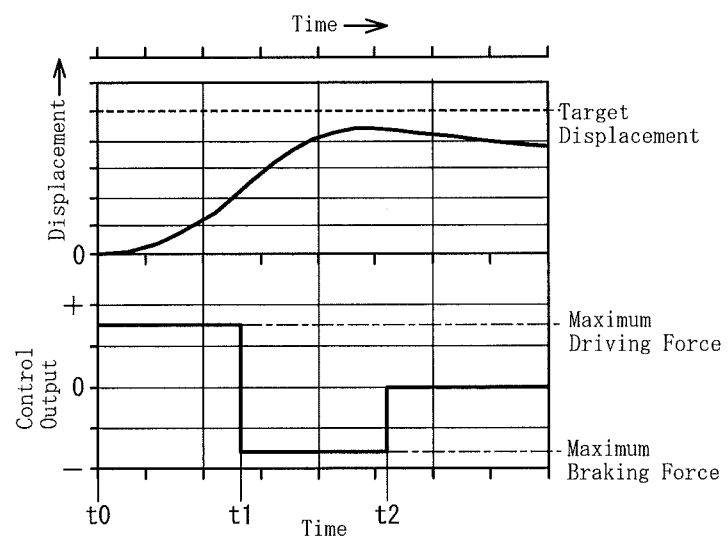
FIG. 20 is a graph showing a control result in a case where there is a damping force of the mechanical system of the time optimal control of the conventional technology.

A simplest example of the time optimal control is shown in FIGS. 19 and 20. FIG. 19 shows a case where there is no damping force of a mechanical system, and FIG. 20 shows a case where there is a damping force of the mechanical system. In FIGS. 19 and 20, the actuator is actuated from the calculation time t0 toward a target by the maximum thrust force, the actuator is then actuated by the maximum deceleration at the switching time t1, and subsequently an actuator thrust force is set to be zero at the end time t2. As described above, in the time optimal control, the control can be performed if the switching time t1 and the end time t2 are determined. The switching time t1 and the end time t2 can be determined based on the following calculation conditions.

In the calculation conditions, it is assumed that a controlled object reaches a target tracing on adjacent two quadratic curves. Additionally, set as known values are: the maximum acceleration αp that can be generated by the actuator; the maximum deceleration αm that can be generated by the actuator; a deviation X (=target variable-controlled variable: a difference between a target position and a position at the time of control) between the target variable and the controlled variable at the calculation time t0; and a velocity V0 of the controlled object at the calculation time t0, and it is set as constraint conditions that the two quadratic curves get contact with each other at the switching time t1, the velocity of the controlled object is set as zero at the end time t2 (V=0), and that the deviation X is set as zero at the end time t2 (X=0), whereby the switching time t1 and the end time t2 are figured out.

Figure 2:
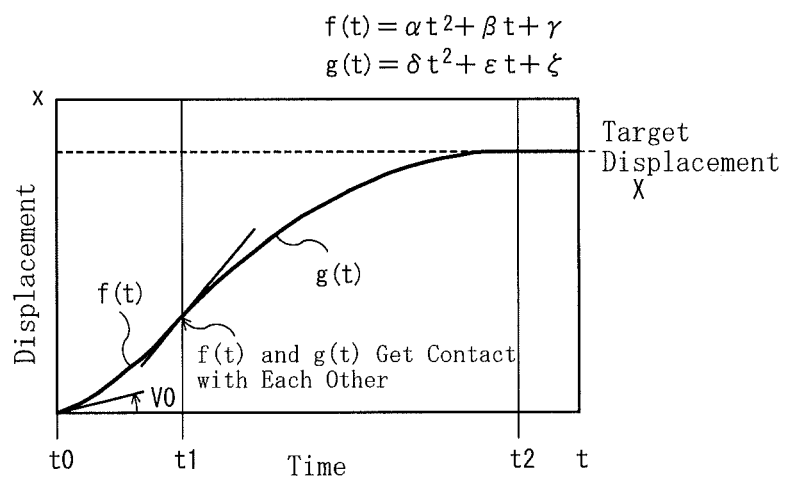
FIG. 2 is a graph for explaining calculation conditions of control trajectories.

A control trajectory is assumed to include two quadratic curves f(t) and g(t) as shown in FIG. 2, and based on the following conditions, figured out are the switching time t1 at which a control output is switched and the end time t2 at which the control output is ended. In addition, accelerations α1 and α2 are determined from Table 1. In addition, V0 is a first-order derivative value (or difference value) of the controlled variable obtained during the control.

Calculation conditions are the following (1) to (7).

(1) The maximum acceleration αp and the maximum deceleration αm that can be generated at the time of a maximum output of the actuator are known, i.e., they can be obtained by a previously measured acceleration.

(2) The velocity V0 at the calculation time t0 is known, i.e., it can be obtained by a first-order derivation (or difference) of a measured value.

(3) A value of a first quadratic curve f(t0) at the calculation time t0 is zero.

(4) A first-order derivative value of the first quadratic curve f(t0) at the calculation time t0 is a velocity (an initial velocity) at the time to.

(5) A second quadratic curve g(t) gets contact with the first quadratic curve f(t) at the switching time t1.

(6) A value of a second quadratic curve g(t2) at the end time t2 is a target value.

(7) A first-order derivative value of the second quadratic curve g(t) at the end time t2 is zero.

The following Expressions (3) to (13) are obtained from the above conditions. These Expressions are simultaneously used, thereby the switching time t1 and the end time t2 of the output are figured out, and the accelerations α1 and α2 are figured out. Here, α1 is an acceleration from the calculation time t0 to the switching time t1, α2 is an acceleration from the switching time t1 to the end time t2, α2=αm when α1=αp, and α2=αp when α1=αm.

[Formula 3]

$$f(t) = \alpha t^2 + \beta t + \gamma \qquad \text{Expression (3)}$$

$$g(t) = \delta t^2 + \varepsilon t + \zeta \qquad \text{Expression (4)}$$

$$f(0) = 0 \qquad \text{Expression (5)}$$

$$\frac{df(0)}{dt} = V0 \qquad \text{Expression (6)}$$

$$\frac{d^2 f(0)}{dt^2} = \alpha 1 \qquad \text{Expression (7)}$$

$$f(t1) = g(t1) \qquad \text{Expression (8)}$$

$$\frac{df(t1)}{dt} = \frac{dg(t1)}{dt} \qquad \text{Expression (9)}$$

$$g(t2) = X \qquad \text{Expression (11)}$$

$$\frac{dg(t2)}{dt} = 0 \qquad \text{Expression (12)}$$

$$\frac{d^2 g(t2)}{dt^2} = \alpha 2 \qquad \text{Expression (13)}$$

According to Expressions (3) and (5),

[Formula 4]

$$\gamma = 0 \qquad \text{Expression (13)}$$

According to Expressions (3), (6), and (13),

[Formula 5]

$$\frac{df(0)}{dt} = 2\alpha \cdot 0 + \beta = \beta = V0 \qquad \text{Expression (14)}$$

According to Expressions (3) and (7),

[Formula 6]

$$\frac{d^2 f(0)}{dt^2} = 2\alpha = \alpha 1 \qquad \text{Expression (15)}$$

$$\alpha = \frac{\alpha 1}{2}$$

According to Expressions (4) and (12),

[Formula 7]

$$\delta = \frac{\alpha 2}{2} \quad \text{Expression (16)}$$

According to Expressions (4), (11), and (16),

[Formula 8]

$$\frac{dg(t2)}{dt} = 2\delta \cdot t2 + \varepsilon = \alpha 2 \cdot t2 + \varepsilon = 0 \quad \text{Expression (17)}$$
$$\varepsilon = -\alpha 2 \cdot t2$$

According to Expressions (4), (10), (16), and (17),

[Formula 9]

$$g(t2) = \delta \cdot t2^2 + \varepsilon \cdot t2 + \zeta \quad \text{Expression (18)}$$
$$= \frac{\alpha 2}{2} t2^2 - \alpha 2 \cdot t2^2 + \zeta$$
$$= -\frac{\alpha 2}{2} t2^2 + \zeta = X$$

Expression (18) is transformed,

[Formula 10]

$$\zeta = X + \frac{\alpha 2}{2} t2^2 \quad \text{Expression (19)}$$

According to Expressions (3), (5), (9), (15), (16), (17), and (19),

[Formula 11]

$$\frac{df(t1)}{dt} = \frac{dg(t1)}{dt} \quad \text{Expression (20)}$$
$$\alpha 1 \cdot t1 = V0 = \alpha 2 \cdot t1 - \alpha 2 \cdot t2$$
$$t2 = \frac{-(\alpha 1 - \alpha 2)t1 - V0}{\alpha 2}$$

According to Expressions (3), (5), (8), (15), (16), (17), (19), and (20),

[Formula 12]

$$\frac{\alpha 1}{2} t1^2 + V0 \cdot t1 = \frac{\alpha 2}{2} t1^2 - \alpha 2 \cdot t2 \cdot t1 + X + \frac{\alpha 2}{2} t2^2 \quad \text{Expression (21)}$$
$$= \frac{(\alpha 1 - \alpha 2)}{2} t1^2 + (V0 + \alpha 2 \cdot t2) t1 - X - \frac{\alpha 2}{2} t2^2$$
$$= \frac{(\alpha 1 - \alpha 2)}{2} t1^2 + V0 + \left[\alpha 2 \frac{-(\alpha 1 - \alpha 2)t1 - V0}{\alpha 2}\right] t1 - X - \frac{\alpha 2}{2} \left[\frac{-(\alpha 1 - \alpha 2)t1 - V0}{\alpha 2}\right]^2$$
$$= -\frac{(\alpha 1 - \alpha 2)}{2} t1^2 - X - \frac{((\alpha 1 - \alpha 2)t1 + V0)^2}{2\alpha 2}$$
$$= -\frac{(\alpha 1 - \alpha 2)}{2} t1^2 - X - \frac{(\alpha 1 - \alpha 2)^2 t1^2 + 2V0(\alpha 1 - \alpha 2)t1 + V0^2}{\alpha 2}$$
$$= -\alpha 2(\alpha 1 - \alpha 2)^2 t1^2 - 2\alpha 2 \cdot X - (\alpha 1 - \alpha 2)^2 t1^2 - 2V0(\alpha 1 - \alpha 2)t1 - V0^2$$
$$= -\alpha 1(\alpha 1 - \alpha 2)^2 t1^2 - 2V0(\alpha 1 - \alpha 2) t1 - 2\alpha 2 \cdot X - V0^2 = 0$$
$$\alpha 1(\alpha 1 - \alpha 2)^2 t1^2 + 2(\alpha 1 - \alpha 2)V0 \cdot t1 + 2\alpha 2 \cdot X + V0^2 = 0$$

Expression (21) is transformed,

[Formula 13]

$$(\alpha 1 - \alpha 2)\alpha 1 \cdot t1^2 + 2(\alpha 1 - \alpha 2)V0 \cdot t1 + V0^2 + 2X \cdot \alpha 2 = 0 \quad \text{Expression (22)}$$

A formula for a solution of quadratic equations is applied to (22),

[Formula 14]

$$t1 = \frac{-2(\alpha 1 - \alpha 2)V0 \pm \sqrt{4(\alpha 1 - \alpha 2)^2 V0^2 - 4(\alpha 1 - \alpha 2)(V0^2 \cdot 2 - 2X\alpha 2)\alpha 1}}{2\alpha 1(\alpha 1 - \alpha 2)} \quad \text{Expression (23)}$$

Expression (23) is substituted in Expression (20), and t2 is obtained.

Figure 4:
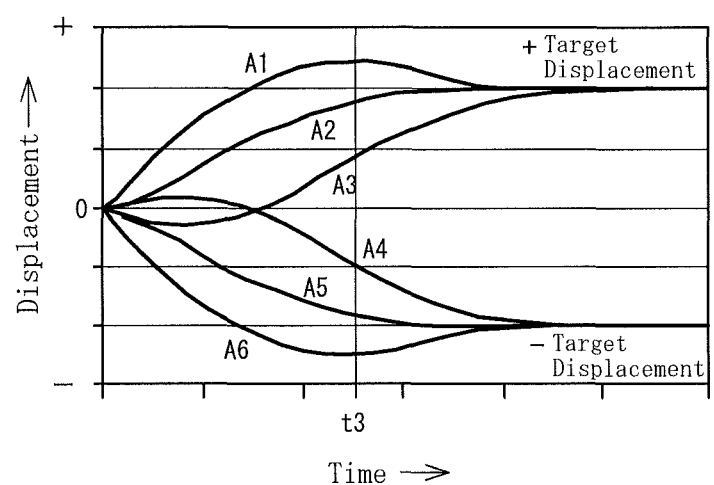
FIG. 4 is a graph showing target trajectories that can be traced by f(t) and g(t).

Here, trajectories that can be traced by f(t) and g(t) are six kinds of A1 to A6 shown in FIG. 4. These six kinds are divided by the case.

When X>0 and V0>0, A1 is a state of exceeding the target even though the velocity is decreased with the maximum deceleration αm generated by the actuator. Given that set as t3 is a time until the velocity becomes zero when decelerated by the maximum deceleration αm, it is established that t3=V0/αm, and a condition to overshoot at the time t3 is V0×t3/2=V0²/2αm>X.

When X>0 and V0>0, A2 is a state of not exceeding the target if the velocity is decreased with the maximum deceleration αm generated by the actuator. When calculation is performed similar to A1, a condition not to overshoot at the time t3 is V0²/2αm<X.

A3 is under a condition where X>0 and V0<0, and A4 is under a condition of X<0 and V0>0. In addition, when X<0 and V0<0, A5 is a state of not exceeding the target if the velocity is decreased with the maximum deceleration αp generated by the actuator. When calculation is performed similar to A1, a condition not to overshoot at the time t3 is V0²/2αp>X.

When X<0 and V0<0, A6 is a state of exceeding the target even though the velocity is decreased with the maximum deceleration αp generated by the actuator. When calculation is performed similar to A1, a condition to overshoot at the time t3 is V0²/2αp<X.

A1, A2, and A3 are changes from upper convexes to lower convexes, and it is established that α1=αm<0 and α2=αp>0, while A4, A5, and A6 are changes from lower convexes to upper convexes, and it is established that α1=αp>0 and α2=αm<0. From these, α1 and α2 are determined. Case division of the above is shown in Table 1.

TABLE 1

| | | | | |
|---|---|---|---|---|
| A1 | X > 0 | V₀ > 0 | V0²/2αm > X | α1 = αm, α2 = αp |
| A2 | | | V0²/2αm < X | α1 = αp, α2 = αm |
| A3 | | V₀ < 0 | | α1 = αp, α2 = αm |
| A4 | X < 0 | V₀ > 0 | | α1 = αm, α2 = αp |
| A5 | | V₀ < 0 | V0²/2αp > X | α1 = αm, α2 = αp |
| A6 | | | V0²/2αp < X | α1 = αp, α2 = αm |

α1 and α2 figured out in the manner as described above are multiplied by a virtual mass m to thereby figure out an actuator thrust force. That is, the actuator thrust force is an actuator thrust force 1 (=α1×virtual mass) from the calculation time t0 to the switching time t1, and is an actuator thrust force 2 (=α2×virtual mass) from the switching time t1 to the end time t2.

Figure 5:
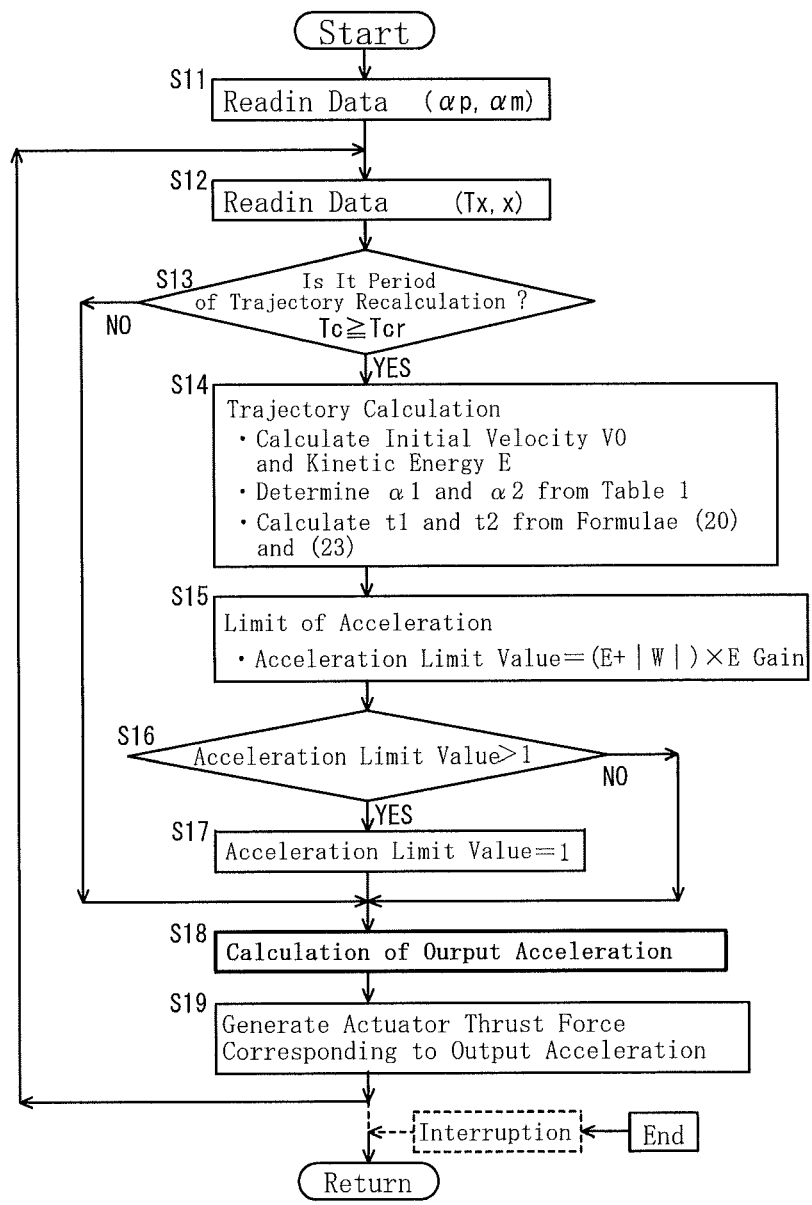
FIG. 5 is a diagram showing one example of a control flow of the actuator control method of the embodiment of the present invention.
Figure 6:
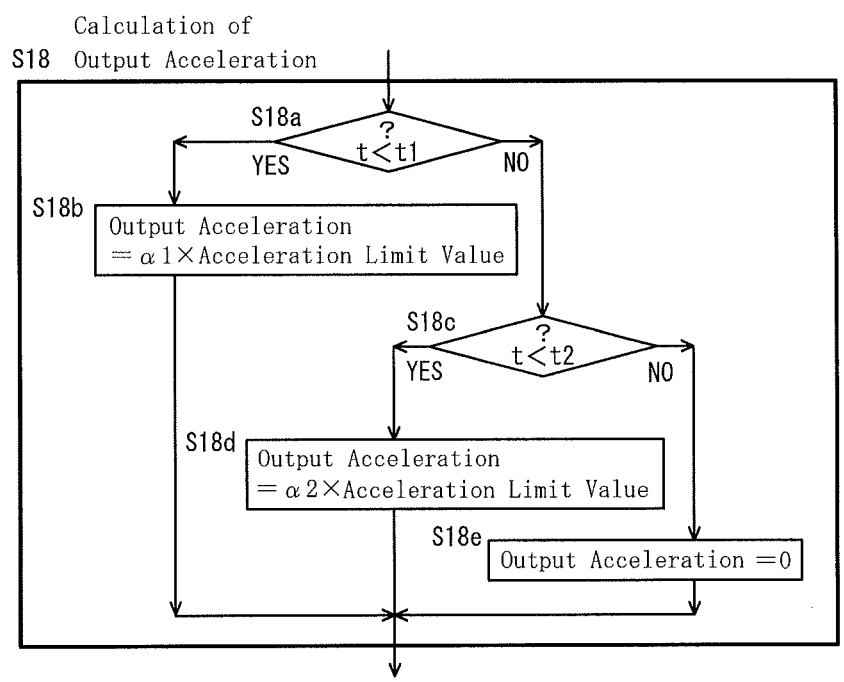
FIG. 6 is a diagram showing a detailed control flow of step S18 of the control flow of FIG. 5.

The time optimal control used in the actuator control method of the embodiment of the present invention can be performed by a control flow shown in FIGS. 5 and 6. When this control flow starts, data of the maximum acceleration αp and the maximum deceleration αm is read in step S11. In next step S12, data of a target variable (target value) Tx and a controlled variable (control value) x are read. Along with that, an elapsed time t and a recalculation elapsed time tc are started to be counted. In step S13, it is determined whether or not the time is a period of trajectory recalculation, i.e., it is determined whether or not the recalculation elapsed time tc after performing trajectory calculation is not less than a period tcr of the trajectory recalculation. If the recalculation elapsed time tc is the period tcr of the trajectory recalculation in step S13 (YES), trajectory calculation is re-performed in step S14, and subsequently the process proceeds to step S15, and if the recalculation elapsed time tc is not the period of the trajectory recalculation in step S13 (NO), the trajectory calculation of step S14 is bypassed, and the process proceeds to step S18. It is to be noted that although the period tcr of the trajectory recalculation is preferably set as approximately 1/10 of a control period, there arises no problem even though the period tcr of the trajectory recalculation is set to be the same as the control period.

In the trajectory calculation of step S14, the initial velocity V0 is calculated by "V0=(x−x₋₁)/tcr" (x₋₁ is a controlled variable before the calculation period), kinetic energy E is calculated by "E=V0²/2", α1 and α2 are determined from Table 1, and the switching time t1 and the end time t2 are calculated according to Expressions (23) and (20). In addition, the recalculation elapsed time tc is reset to be zero (Tc=0).

Next, in step S15, calculated is an acceleration limit value (a control output limit value) for limiting an acceleration. The acceleration limit value is the value obtained by multiplying a sum (residual energy) of the kinetic energy E and an absolute value |W| of remaining work W by an E gain. That is, it is established that "acceleration limit value=(E+|W|)×E gain".

Since a maximum value of the acceleration limit value is 1, it is determined whether or not the acceleration limit value is larger than 1 in step S17, and if it is larger than 1 (YES), the acceleration limit value is set as 1 in step S17, and subsequently the process proceeds to step S18. If the acceleration limit value is not larger than 1 in step S17 (NO), the value is kept as it is, and the process proceeds to step S18.

In step S18, as shown in FIG. 6, when the process enters step S18, it is determined whether or not the elapsed time t is smaller than the switching time t1 in first step S18a, if it is smaller (YES), the process proceeds to step S18b, an output acceleration is set as an "α1×acceleration limit value", and subsequently the process proceeds to step S19. If the elapsed time t is not smaller than the switching time t1 in step S18a (NO), the process proceeds to step S18c, it is determined whether or not the elapsed time t is smaller than the end time t2, and if it is smaller (YES), the process proceeds to step S18d, the output acceleration is set as an "α2×acceleration limit value", and subsequently the process proceeds to step S19. In addition, if the elapsed time t is not smaller than the end time t2 in step S18c (NO), the process proceeds to step S18e, the output acceleration is set as "zero", and subsequently the process proceeds to step S19.

In step S19, the actuator thrust force corresponding to the output acceleration is generated during a preset time (a time relevant to an interval of various types of determination), and the controlled object is controlled. In addition, the elapsed time t and the recalculation elapsed time tc are counted. After that, the process returns to step S12, and repeats steps S12 to S19. From this, the thrust force of the actuator can be controlled while the trajectory calculation of step S14 is recalculated every time when the recalculation elapsed time tc has elapsed the period tcr of the trajectory recalculation.

It is to be noted that when a circumstance where the control of FIG. 5 should be ended, such as the elapsed time t exceeding the preset time, and a switch signal to end the control being input, occurs, interruption occurs even though any step of this control flow is carried out, the process proceeds to a return, returns to a high-order control flow, and the control flow of FIG. 5 is also ended simultaneously with the end of the high-order control flow.

Operation of the actuator is switched at the switching time t1 and the end time t2 that have been figured out in the manner as described above, and thereby an ideal control result as shown in FIG. 19 is obtained. However, this result is the result under an ideal situation where there are no friction, damping, error, etc. When a mechanical damping force exists in a controlled object, a control result does not agree with a target as shown in FIG. 20.

Figure 3:
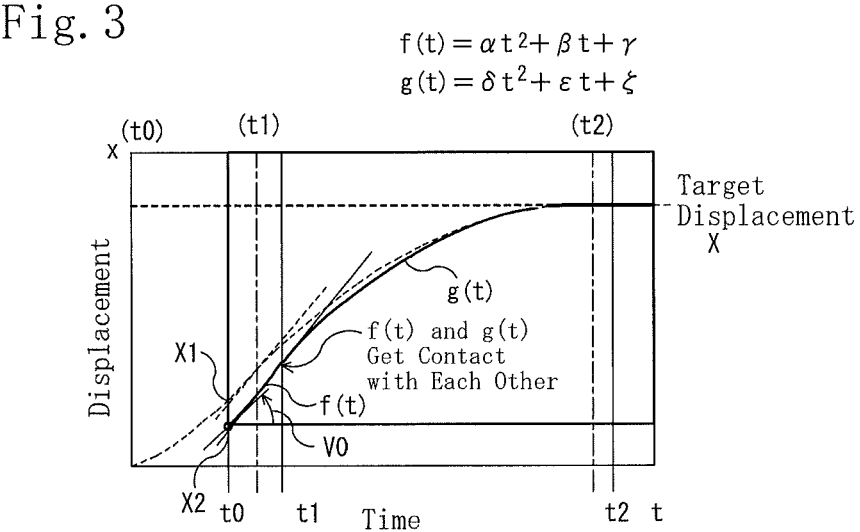
FIG. 3 is a graph for explaining the change of control trajectories in recalculation.

In order to solve this problem, in the actuator control method of the present invention, a target trajectory is modified for each preset time of a constant period or an irregular period. Changes of the control trajectory by means of the recalculation are shown in FIG. 3. In this FIG. 3, when a control trajectory (dotted line) of first calculation is actually an X2 although it is going to be an X1, a new control trajectory (solid line) is calculated by means of recalculation, the switching time t1 and the end time t2 also have new values, and a control force is controlled based on these new switching time t1 and end time t2.

Figure 17:
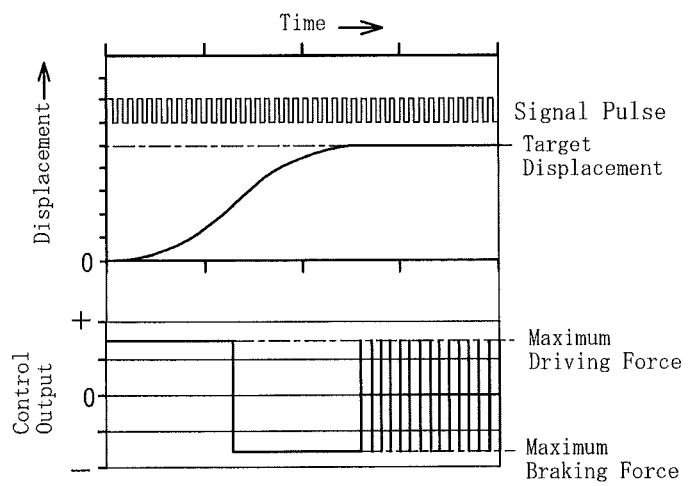
FIG. 17 is a graph showing a control result in a case where there is no damping force of the mechanical system of the feedback time optimal control in which the energy gain has not been introduced in an actuator control method serving as a useful reference of the present invention.
Figure 18:
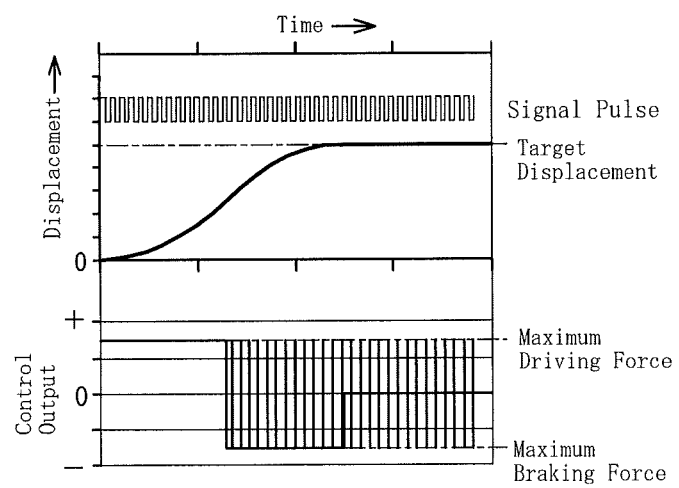
FIG. 18 is a graph showing a control result in a case where there is a damping force of the mechanical system of the feedback time optimal control in which the energy gain has not been introduced in the actuator control method serving as the useful reference of the present invention.

In FIGS. 17 and 18, shown are control results when the switching time t1 and the end time t2 are recalculated for each constant period. Recalculation is carried out at the timing of rising of a signal pulse. This time optimal control method is here referred to as a FB (feedback) time optimal control method in order to distinguish from a time optimal control method of a conventional technology. Although a case where there is no damping force of a mechanical system is shown in FIG. 17, and a case where there is a damping force of the mechanical system is shown n FIG. 18, it turns out that the controlled object can be made to agree with a target position by a substantially ideal trajectory even when there is a mechanical damping force in the controlled object as shown in FIG. 18 as a result.

However, even though the controlled variable agrees with the control target, it turned out that a pulsed control output remained to be generated.

As a method that solves this problem and converges the control output after the end of the control, the present invention employs a method that reduces the control output along with decrease of the residual energy defined as the sum of the remaining work and the kinetic energy of the control system. In addition, used is the energy gain (E gain) as a coefficient for determining a size of the control output with respect to the residual energy.

Here, a value obtained by multiplying the acceleration $\alpha 2$ near the target position by the deviation X and the mass m is defined as remaining work, and the residual energy is defined as the sum of the remaining work and the kinetic energy. That is, it is established that "remaining work=$\alpha 2 \times$ X×m", and that "residual energy=|remaining work|+kinetic energy".

Here, "m" is a mass of the control system (may be a virtual mass), and it is defined that "m=actuator maximum thrust force/$\alpha 2$".

Figure 7:
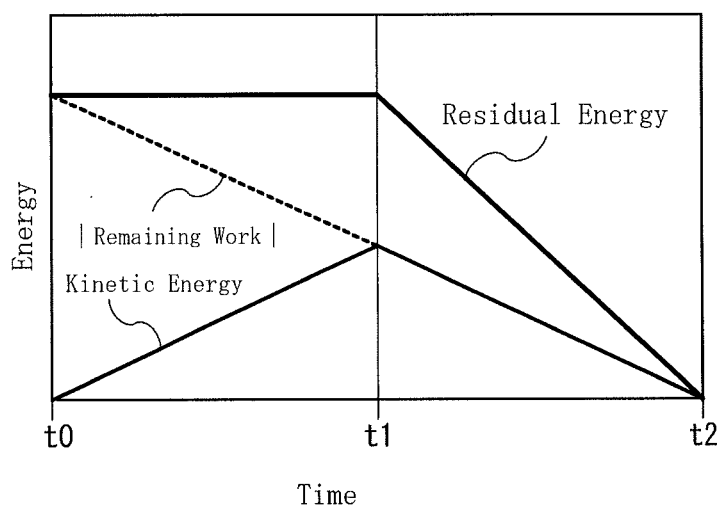
FIG. 7 is a graph showing residual energy in the time optimal control in the actuator control method of the embodiment of the present invention.

Temporal change of the residual energy defined as described above is shown in FIG. 7. As shown in this FIG. 7, since the residual energy becomes zero only when deviation=0 and velocity=0, it becomes possible to utilize the residual energy as an evaluation value of the control.

Figure 8:
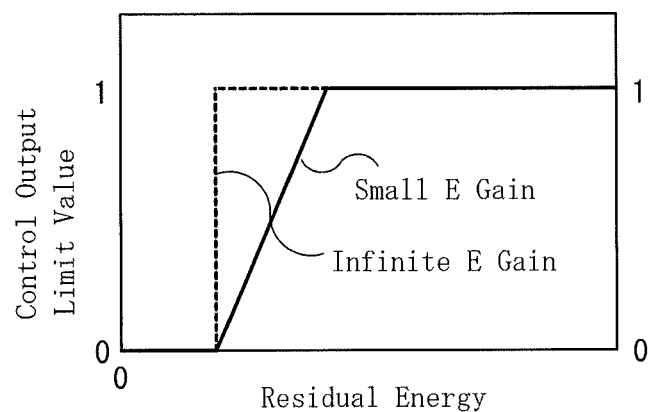
FIG. 8 is a graph showing one example of a relation between the residual energy and a control output (control output limit value) in the actuator control method of the embodiment of the present invention.
Figure 9:
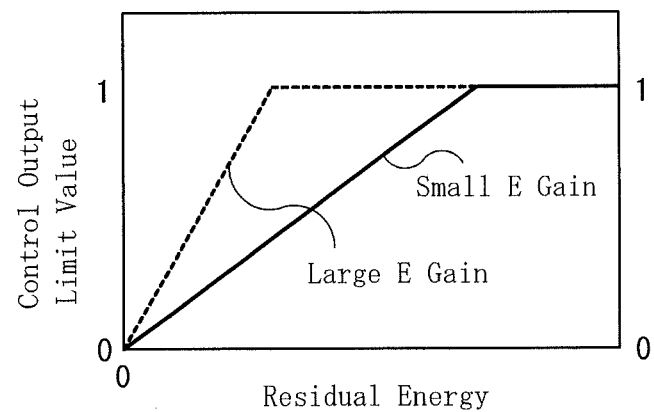
FIG. 9 is a graph showing another example of the relation between the residual energy and the control output (control output limit value) in the actuator control method of the embodiment of the present invention.

Additionally, in the control, the control output desirably becomes zero simultaneously with the end of the control in order to stabilize the control and to reduce energy consumption. Consequently, the control output is set to be zero simultaneously with the end of the control by multiplying the control output by the appropriate residual energy as the evaluation value of the end of the control. Specifically, in accordance with map data in which a relation between "residual energy×E gain and control output limit value" as shown in FIGS. 8 and 9 has been made into data, a control output limit value is determined, and a value obtained by multiplying the maximum thrust force by the control output limit value is set as the control output. A maximum value of the control output limit value is 1. In addition, at the time of recalculation in each preset time of the constant period and the irregular period, values obtained by multiplying the maximum acceleration and the maximum deceleration by the control output limit value are recalculated as a maximum acceleration and a maximum deceleration.

Figure 10:
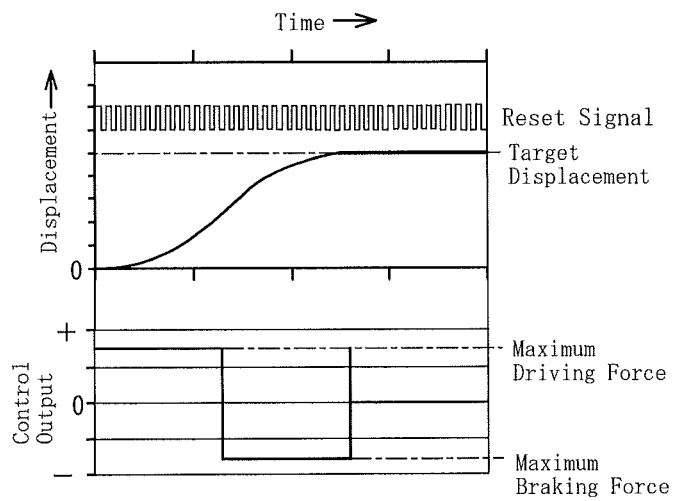
FIG. 10 is a graph showing a control result in a case where there is no damping force of a mechanical system of feedback time optimal control in which an energy gain has been introduced in the actuator control method of the embodiment of the present invention.
Figure 11:
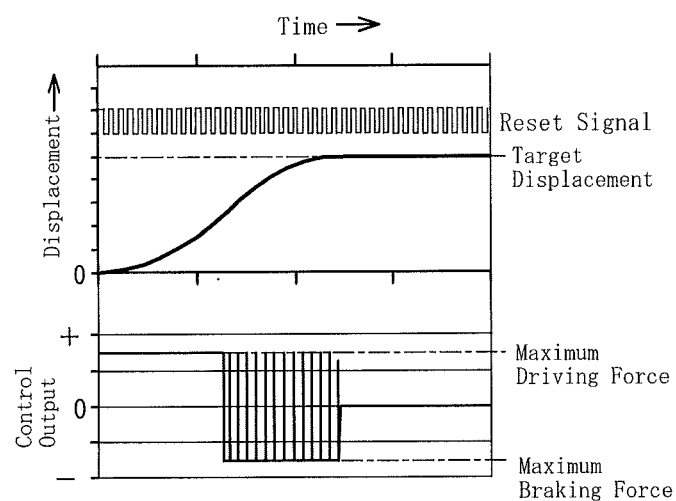
FIG. 11 is a graph showing a control result in a case where there is a damping force of the mechanical system of the feedback time optimal control in which the energy gain has been introduced in the actuator control method of the embodiment of the present invention.

From this, the actuator thrust force becomes an "actuator thrust force=actuator maximum thrust force×residual energy×E gain". Results of this control are shown in FIGS. 10 and 11. It turns out that the control output is also zero when the controlled variable becomes the control target, and the controlled object agrees with the target.

It is to be noted that just for reference, although a model used as a base differs in the time optimal control, the residual energy in the PID control can be used as an evaluation index of control used in evaluation of the control used for quality engineering being carried out, and it can be defined as a sum of potential energy and kinetic energy of the control system.

The potential energy of the control system in the PID control is strain energy of a spring system, and given that a difference between a target and a control value is set as a strain amount X, and that a spring constant of the control system is set as k (corresponding to the P term), the potential energy can be defined as "$(½)*kx^2=(½)*Px^2$". In addition, given that a mass of the control system is set as m (it may be a virtual mass), and that a velocity is set as dx/dt=v, the kinetic energy of the control system can be defined as "$(½)*mv^2$".

Figure 22:
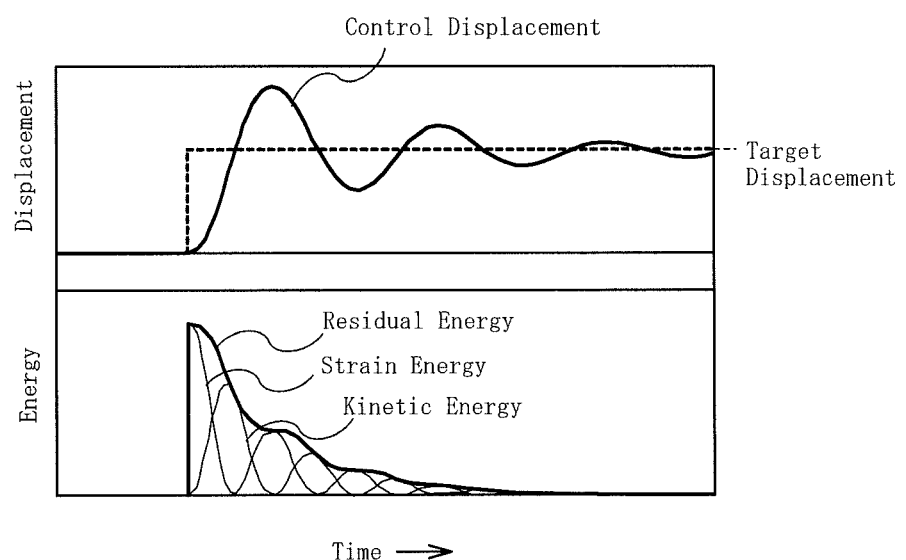
FIG. 22 is a graph showing residual energy of the PID control.

When considering here what it means that control is ended, it is obvious that the end of the control is a time when deviation is zero and the velocity is also zero. In other words, it is the time when potential energy=0 and kinetic energy=0. That is, it can be determined that the control is ended when residual energy=0, the residual energy being the sum of the potential energy and the kinetic energy. A general control waveform in the residual energy is formed as FIG. 22, and the residual energy monotonically reduces from the start of the control, and becomes zero simultaneously with the end of the control even if there is an overshoot, it turns out that the residual energy is appropriate as the evaluation value of the control.

Figure 12:
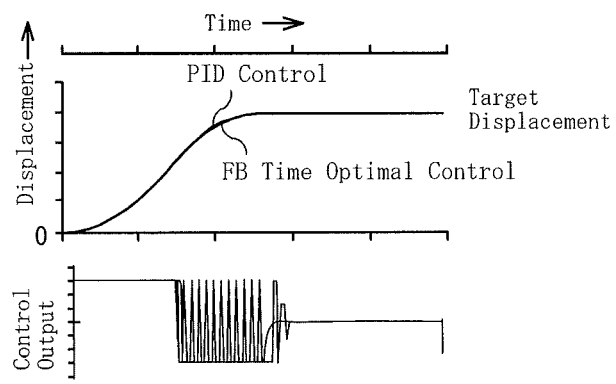
FIG. 12 is a graph showing control results of a working example and a comparative example in a case where a damping coefficient of the mechanical system is 1.
Figure 13:
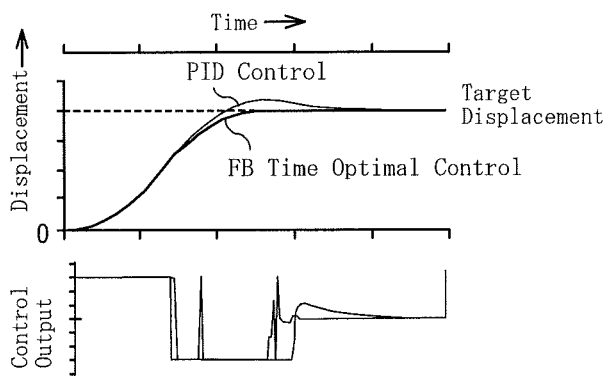
FIG. 13 is a graph showing control results of the working example and the comparative example in a case where the damping coefficient of the mechanical system is 0.1.
Figure 14:
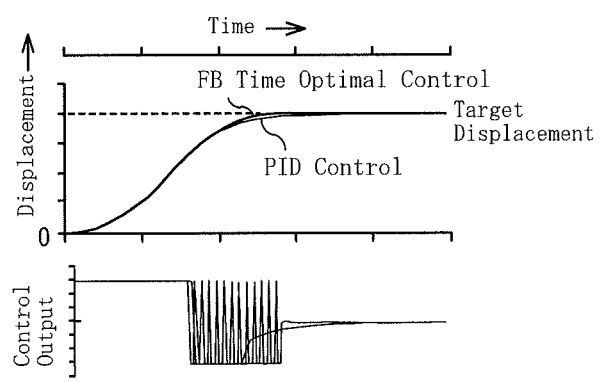
FIG. 14 is a graph showing control results of the working example and the comparative example in a case where the damping coefficient of the mechanical system is 2.

In FIGS. 12 to 14, shown are comparison results of a working example of the feedback time optimal control and a comparative example of the PID control. In both control, control gains were adjusted on the basis of a time when a damping coefficient of the mechanical system shown in FIG. 12 was set as 1. In FIGS. 13 and 14, only the damping coefficients of the mechanical system were changed to 0.1 and 2 with the control gains being fixed. First, when FIG. 12 is seen, substantially equal results are shown although the control is performed a little faster in the comparative example of the PID control. In contrast with this, in a case of FIG. 13 where the damping coefficient is made small, whereas a control result without any overshoot is obtained in the working example of the FB time optimal control, a large overshoot is generated in the comparative example of the PID control. Meanwhile, in a case of FIG. 14 where the damping coefficient is made large, while a controlled target quickly reaches a target in the working example of the feedback time optimal control, a speed is largely reduced just before the target, and a response to the target becomes slow in the comparative example of the PID control. As described above, it turns out that a control result more stable than in the comparative example of the PID control is obtained in the working example of the feedback time optimal control with respect to resistance change expressed indicated by the change of the damping coefficient of the controlled object.

Figure 15:
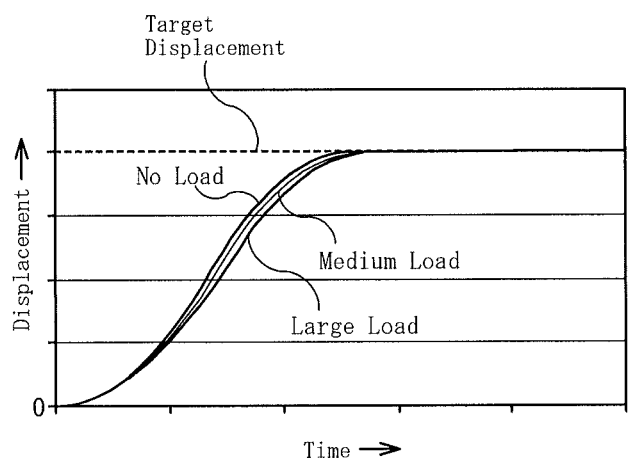
FIG. 15 is a graph showing a simulation result of the working example.
Figure 16:
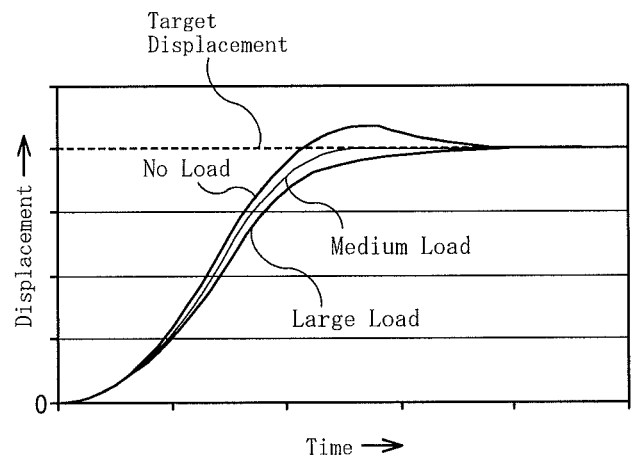
FIG. 16 is a graph showing a simulation result of the comparative example.

Furthermore, a simulation result of the working example of the feedback time optimal control is shown in FIG. 15, and a simulation result of the comparative example of the PID control is shown in FIG. 16. When these results are compared with each other, whereas control results greatly change with respect to load fluctuation of the control system in the comparative example of the PID control shown in FIG. 16, control results have no disorder and the stable control results are always obtained in the working example of the feedback time optimal control shown in FIG. 15. That is, whereas the control results greatly change with respect to the load fluctuation of the control system in the comparative example shown in FIG. 16, the control results have no disorder and the stable control results are always obtained in the working example of FIG. 15.

Accordingly, according to the above-described actuator control method and actuator control device, because of the time optimal control, a control speed is high, a maximum acceleration and a maximum deceleration can be set by measurement, and there is no adjustment term other than these, so that a control gain need not be adjusted. In addition, since the control serves as ON/OFF control, an intermediate output need not be generated, and a controller and a driver can be simplified.

In addition, since incorporated is the feedback element that updates the switching time t1 and the end time t2 for each preset time by inputting the deviation X of the target variable and the controlled variable at each time of the control, stable control results can be always obtained even though an external force changes or without shortening the control period. As a result of it, a "control speed" and "stability", which have been competing large problems in a conventional control law, can be balanced.

Moreover, a control output can be converged to be zero after the end of the control by reducing the control output along with decrease of the residual energy, which is the sum of the remaining work and the kinetic energy of the control system.

According to the actuator control method and the actuator control device of the present invention, since a control speed is high, and a control gain need not be adjusted, and control serves as ON/OFF control, an intermediate output need not be generated, and a controller and a driver can be simplified, and additionally, since incorporated is a feedback element that updates a switching time and an end time for each preset time by inputting a deviation of a target variable and a controlled variable at each time of the control, stable control results can be always obtained even though an external force changes or without shortening a control period, and moreover, since a control output can be converged to be zero after the end of the control by reducing the control output along with decrease of residual energy, which is a sum of remaining work and kinetic energy of a control system, the present invention can be utilized as a control method and a control device for a number of actuators, such as a device mounted in an automobile etc.

The invention claimed is:

1. An actuator control method, using time optimal control comprising:
a calculation step of calculating a switching time (t1) at which an acceleration output is switched to a deceleration output, and an end time (t2) of the deceleration output expressed by an elapsed time from a calculation time (t0) at which calculation for control is performed using a maximum acceleration ($\alpha p$) and a maximum deceleration ($\alpha m$) at the time of a maximum output of a control force of an actuator, which are previously measured;
a control output step of setting the control force of the actuator as a maximum acceleration output from the calculation time (t0) to the switching time (t1), setting the control force of the actuator as a maximum deceleration output from the switching time (t1) to the end time (t2), and ending the output of the control force at the end time (t2);
an update step of repeating the calculation step for each preset time, and calculating and updating the switching time (t1) and the end time (t2); and
a control output reduction step of reducing the control output along with decrease of residual energy, which is a sum of remaining work and kinetic energy of a control system.

2. The actuator control method according to claim 1, wherein in the control output reduction step, values are set as outputs of the control force, the values being obtained by multiplying each of the maximum acceleration output and the maximum deceleration output by the residual energy, and further multiplying the multiplied values by an energy gain, which is a coefficient for determining a size of the control output with respect to the residual energy.

3. The actuator control method according to claim 1, wherein in the update step, values obtained by multiplying the maximum acceleration and the maximum deceleration by a control output limit value are recalculated as a new maximum acceleration and maximum deceleration.

4. The actuator control method according to claim 1, wherein in the calculation step, given that a trajectory from a position at the calculation time (t0) to a target position at the end time (t2) is represented by a combination of adjacent two quadratic curves, an initial velocity is set as V0, and that deviation of the target position and a controlled variable is set as X, the switching time (t1) and the end time (t2) are calculated by Expressions (1) and (2),

[Formula 1]
$$t1 = \frac{-2(\alpha 1 - \alpha 2)V0 \pm \sqrt{4(\alpha 1 - \alpha 2)^2 V0^2 - 4(\alpha 1 - \alpha 2)(V0^2 - 2X\alpha 2)\alpha 1}}{2\alpha 1(\alpha 1 - \alpha 2)} \quad \text{Expression (1)}$$

[Formula 2]
$$t2 = \frac{-(\alpha 1 - \alpha 2)t1 - V0}{\alpha 2} \quad \text{Expression (2)}$$

where, $\alpha 1$ is the maximum acceleration ($\alpha p$) or the maximum deceleration ($\alpha m$) from the calculation time (t0) to the switching time (t1), and ($\alpha 2$) is the maximum deceleration ($\alpha m$) or the maximum acceleration ($\alpha p$) from the switching time (t1) to the end time (t2).

5. An actuator control device, using time optimal control comprising:
a memory; and
a processor coupled to the memory and configured to:
calculate a switching time (t1) at which an acceleration output is switched to a deceleration output, and an end time (t2) of the deceleration output expressed by an elapsed time from a calculation time (t0) at which calculation for control is performed using a maximum acceleration ($\alpha p$) and a maximum deceleration ($\alpha m$) at the time of a maximum output of a control force of an actuator, which are previously measured;
set the control force of the actuator as a maximum acceleration output from the calculation time (t0) to the switching time (t1), set the control force of the actuator as a maximum deceleration output from the switching time (t1) to the end time (t2), and end the output of the control force at the end time (t2);

repeatedly calculate, and update the switching time (t1) and the end time (t2) for each preset time; and reduce the control output along with decrease of residual energy, which is a sum of remaining work and kinetic energy of a control system.

6. The actuator control device according to claim 5, wherein the processor is further configured to set values as outputs of the control force, the values being obtained by multiplying each of the maximum acceleration output and the maximum deceleration output by the residual energy, and further multiplying the multiplied values by an energy gain, which is a coefficient for determining a size of the control output with respect to the residual energy.

7. The actuator control device according to claim 5, wherein the processor is further configured to recalculate values obtained by multiplying the maximum acceleration and the maximum deceleration by a control output limit value, as a new maximum acceleration and maximum deceleration.

8. The actuator control device according to claim 5, wherein given that a trajectory from a position at the calculation time (t0) to a target position at the end time (t2) is represented by a combination of adjacent two quadratic curves, an initial velocity is set as V0, and that deviation of the target position and a controlled variable is set as X, the processor is further configured to calculate the switching time (t1) and the end time (t2) by Expressions (1) and (2),

[Formula 1]

$$t1 = \frac{-2(\alpha 1 - \alpha 2)V0 \pm \sqrt{4(\alpha 1 - \alpha 2)^2 V0^2 - 4(\alpha 1 - \alpha 2)(V0^2 - 2X\alpha 2)\alpha 1}}{2\alpha 1(\alpha 1 - \alpha 2)} \quad \text{Expression (1)}$$

[Formula 2]

$$t2 = \frac{-(\alpha 1 - \alpha 2)t1 - V0}{\alpha 2} \quad \text{Expression (2)}$$

9. The actuator control device according to claim 1, wherein the acceleration ($\alpha 1$) from the calculation time (t0) to the switching time (t1), and the acceleration ($\alpha 2$) from the switching time (t1) to the end time (t2), are determined from the following Table 1:

| A1 | X > 0 | $V_0 > 0$ | $V0^2/2\alpha m > X$ | $\alpha 1 = \alpha m, \alpha 2 = \alpha p$ |
|----|-------|-----------|----------------------|-------------------------------------------|
| A2 |       |           | $V0^2/2\alpha m < X$ | $\alpha 1 = \alpha p, \alpha 2 = \alpha m$ |
| A3 |       | $V_0 < 0$ |                      | $\alpha 1 = \alpha p, \alpha 2 = \alpha m$ |
| A4 | X < 0 | $V_0 > 0$ |                      | $\alpha 1 = \alpha m, \alpha 2 = \alpha p$ |
| A5 |       | $V_0 < 0$ | $V0^2/2\alpha p > X$ | $\alpha 1 = \alpha m, \alpha 2 = \alpha p$ |
| A6 |       |           | $V0^2/2\alpha p < X$ | $\alpha 1 = \alpha p, \alpha 2 = \alpha m$ |

10. The actuator control method according to claim 2, wherein in the update step, values obtained by multiplying the maximum acceleration and the maximum deceleration by a control output limit value are recalculated as a new maximum acceleration and maximum deceleration.

11. The actuator control method according to claim 2, wherein in the calculation step, given that a trajectory from a position at the calculation time (t0) to a target position at the end time (t2) is represented by a combination of adjacent two quadratic curves, an initial velocity is set as V0, and that deviation of the target position and a controlled variable is set as X, the switching time (t1) and the end time (t2) are calculated by Expressions (1) and (2),

[Formula 1]

$$t1 = \frac{-2(\alpha 1 - \alpha 2)V0 \pm \sqrt{4(\alpha 1 - \alpha 2)^2 V0^2 - 4(\alpha 1 - \alpha 2)(V0^2 - 2X\alpha 2)\alpha 1}}{2\alpha 1(\alpha 1 - \alpha 2)} \quad \text{Expression (1)}$$

[Formula 2]

$$t2 = \frac{-(\alpha 1 - \alpha 2)t1 - V0}{\alpha 2} \quad \text{Expression (2)}$$

where, $\alpha 1$ is the maximum acceleration ($\alpha p$) or the maximum deceleration ($\alpha m$) from the calculation time (t0) to the switching time (t1), and ($\alpha 2$) is the maximum deceleration ($\alpha m$) or the maximum acceleration ($\alpha p$) from the switching time (t1) to the end time (t2).

12. The actuator control method according to claim 3, wherein in the calculation step, given that a trajectory from a position at the calculation time (t0) to a target position at the end time (t2) is represented by a combination of adjacent two quadratic curves, an initial velocity is set as V0, and that deviation of the target position and a controlled variable is set as X, the switching time (t1) and the end time (t2) are calculated by Expressions (1) and (2),

[Formula 1]

$$t1 = \frac{-2(\alpha 1 - \alpha 2)V0 \pm \sqrt{4(\alpha 1 - \alpha 2)^2 V0^2 - 4(\alpha 1 - \alpha 2)(V0^2 - 2X\alpha 2)\alpha 1}}{2\alpha 1(\alpha 1 - \alpha 2)} \quad \text{Expression (1)}$$

[Formula 2]

$$t2 = \frac{-(\alpha 1 - \alpha 2)t1 - V0}{\alpha 2} \quad \text{Expression (2)}$$

where, $\alpha 1$ is the maximum acceleration ($\alpha p$) or the maximum deceleration ($\alpha m$) from the calculation time (t0) to the switching time (t1), and ($\alpha 2$) is the maximum deceleration ($\alpha m$) or the maximum acceleration ($\alpha p$) from the switching time (t1) to the end time (t2).

13. The actuator control device according to claim 7, wherein given that a trajectory from a position at the calculation time (t0) to a target position at the end time (t2) is represented by a combination of adjacent two quadratic curves, an initial velocity is set as V0, and that deviation of the target position and a controlled variable is set as X, the processor is further configured to calculate the switching time (t1) and the end time (t2) by Expressions (1) and (2),

[Formula 1]

$$t1 = \frac{-2(\alpha 1 - \alpha 2)V0 \pm \sqrt{4(\alpha 1 - \alpha 2)^2 V0^2 - 4(\alpha 1 - \alpha 2)(V0^2 - 2X\alpha 2)\alpha 1}}{2\alpha 1(\alpha 1 - \alpha 2)} \quad \text{Expression (1)}$$

-continued

[Formula 2]

$$t2 = \frac{-(\alpha1 - \alpha2)t1 - V0}{\alpha2} \qquad \text{Expression (2)}$$

where, $\alpha1$ is the maximum acceleration ($\alpha p$) or the maximum deceleration ($\alpha m$) from the calculation time (t0) to the switching time (t1), and $\alpha2$ is the maximum deceleration ($\alpha m$) or the maximum acceleration ($\alpha p$) from the switching time (t1) to the end time (t2).

14. The actuator control device according to claim 6, wherein given that a trajectory from a position at the calculation time (t0) to a target position at the end time (t2) is represented by a combination of adjacent two quadratic curves, an initial velocity is set as V0, and that deviation of the target position and a controlled variable is set as X, the processor is further configured to calculate the switching time (t1) and the end time (t2) by Expressions (1) and (2),

[Formula 1]

$$t1 = \frac{-2(\alpha1 - \alpha2)V0 \pm \sqrt{4(\alpha1-\alpha2)^2 V0^2 - 4(\alpha1-\alpha2)(V0^2 - 2X\alpha2)\alpha1}}{2\alpha1(\alpha1-\alpha2)} \qquad \text{Expression (1)}$$

[Formula 2]

$$t2 = \frac{-(\alpha1 - \alpha2)t1 - V0}{\alpha2} \qquad \text{Expression (2)}$$

where, $\alpha1$ is the maximum acceleration ($\alpha p$) or the maximum deceleration ($\alpha m$) from the calculation time (t0) to the switching time (t1), and $\alpha2$ is the maximum deceleration ($\alpha m$) or the maximum acceleration ($\alpha p$) from the switching time (t1) to the end time (t2).

15. The actuator control device according to claim 7, wherein given that a trajectory from a position at the calculation time (t0) to a target position at the end time (t2) is represented by a combination of adjacent two quadratic curves, an initial velocity is set as V0, and that deviation of the target position and a controlled variable is set as X, the processor is further configured to calculate the switching time (t1) and the end time (t2) by Expressions (1) and (2),

[Formula 1]

$$t1 = \frac{-2(\alpha1 - \alpha2)V0 \pm \sqrt{4(\alpha1-\alpha2)^2 V0^2 - 4(\alpha1-\alpha2)(V0^2 - 2X\alpha2)\alpha1}}{2\alpha1(\alpha1-\alpha2)} \qquad \text{Expression (1)}$$

[Formula 2]

$$t2 = \frac{-(\alpha1 - \alpha2)t1 - V0}{\alpha2} \qquad \text{Expression (2)}$$

where, $\alpha1$ is the maximum acceleration ($\alpha p$) or the maximum deceleration ($\alpha m$) from the calculation time (t0) to the switching time (t1), and $\alpha2$ is the maximum deceleration ($\alpha m$) or the maximum acceleration ($\alpha p$) from the switching time (t1) to the end time (t2).

16. The actuator control device according to claim 5, wherein the acceleration ($\alpha p$) from the calculation time (t0) to the switching time (t1), and the acceleration ($\alpha m$) from the switching time (t1) to the end time (t2), are determined from the following Table 1:

TABLE 1

| | | | | |
|---|---|---|---|---|
| A1 | $X > 0$ | $V_0 > 0$ | $V0^2/2\alpha m > X$ | $\alpha1 = \alpha m, \alpha2 = \alpha p$ |
| A2 | | | $V0^2/2\alpha m < X$ | $\alpha1 = \alpha p, \alpha2 = \alpha m$ |
| A3 | | $V_0 < 0$ | | $\alpha1 = \alpha p, \alpha2 = \alpha m$ |
| A4 | $X < 0$ | $V_0 > 0$ | | $\alpha1 = \alpha m, \alpha2 = \alpha p$ |
| A5 | | $V_0 < 0$ | $V0^2/2\alpha p > X$ | $\alpha1 = \alpha m, \alpha2 = \alpha p$ |
| A6 | | | $V0^2/2\alpha p < X$ | $\alpha1 = \alpha p, \alpha2 = \alpha m$ |

* * * * *